United States Patent [19] [11] 3,688,845
Messenger [45] Sept. 5, 1972

[54] WELL CEMENTING METHOD EMPLOYING AN OIL BASE PREFLUSH

[72] Inventor: Joseph U. Messenger, Dallas, Tex.
[73] Assignee: Mobil Oil Corporation, 2
[22] Filed: March 8, 1971
[21] Appl. No.: 122,123

[52] U.S. Cl. ............166/291, 166/292, 166/312
[51] Int. Cl. .....................E21b 21/00, E21b 33/14
[58] Field of Search......166/291, 285, 292, 293, 294, 166/300, 312, 311

[56] References Cited

UNITED STATES PATENTS

| | | | |
|---|---|---|---|
| 2,848,051 | 8/1958 | Williams | 166/291 |
| 3,022,823 | 2/1962 | Caldwell et al. | 166/291 |
| 3,291,211 | 12/1966 | Savins et al. | 166/285 |
| 3,299,952 | 1/1967 | Savins et al. | 166/285 |
| 3,342,264 | 9/1967 | Willard, Sr. | 166/300 |
| 3,348,612 | 10/1967 | Messenger | 166/292 |
| 3,411,580 | 11/1968 | McKinney et al. | 166/312 X |
| 3,467,193 | 9/1969 | Messenger | 166/292 |
| 3,532,168 | 10/1970 | Webb | 166/292 |
| 3,625,286 | 12/1971 | Parker | 166/291 |

*Primary Examiner*—Stephen J. Novosad
*Attorney*—William J. Scherback, William D. Jackson and Henry L. Ehrlich

[57] ABSTRACT

This specification discloses a method of cementing casing in a well having an oil base drilling mud therein. A preflush solution comprised of an oil and a dispersant, which preflush solution has a lower viscosity and a lower gel strength than the drilling mud in the well, is flowed through the annular space between casing positioned in the well and the well of the well. Thereafter, a cement slurry is flowed into the annular space and allowed to set.

12 Claims, No Drawings

WELL CEMENTING METHOD EMPLOYING AN OIL BASE PREFLUSH

BACKGROUND OF THE INVENTION

This invention relates to cementing casing in a well drilled from he surface of the earth into subterranean formations.

Wells are drilled into subterranean formations for various purposes. For example, they may be drilled into subterranean formations for the purpose of producing hydrocarbons or water therefrom, or for injecting fluids into the subterranean formation.

Rotary drilling techniques wherein a drilling fluid or mud is circulated between the surface of the earth and the bottom of the well are commonly employed in drilling wells. Oil base muds, including water-in-oil emulsion muds of low water content, wherein oil forms the continuous phase, are often used in the drilling and completion of wells. Drilling muds serve many useful purposes, including removal of earth cuttings from the well, control of formation pressures, and cooling and lubricating of the drill bit used in forming the well. However, there are also certain detrimental characteristics associated with drilling muds. For example, drilling muds tend to flow from the well into exposed permeable formations with the result that mud solids are filtered out on the wall of the well, forming a filter cake thereon. Thick filter cakes are particularly harmful in that they may impede or stop the movement of drilling tools in the well. Even thin filter cakes are detrimental in the completion of wells in that they interfere with obtaining a good cement bond between the wall of the well and the casing positioned in the well.

Drilling muds may be considered to be non-Newtonian fluids and are referred to as plastic-type fluids. Their fluid movements are known as plastic flow. Two flow properties, plastic viscosity and yield value, must be known in order to describe the flow behavior of a drilling mud as compared with one flow property, viscosity, required to define the flow characteristics of a Newtonian fluid. Another property often used in characterizing a drilling mud at rest is gel strength.

Plastic viscosity is that part of flow resistance in a mud which represents mechanical friction (1) between solids in the mud, (2) between the solids and the liquid which surround them, and (3) of the shearing of the liquid. Yield value, the second component of resistance to flow in a drilling fluid, is a measurement of the interparticle forces in the mud. These forces are the result of positive and negative electrical charges located on or near particle surfaces. If the mud is allowed to come to rest, the forces tend to move the solid particles around until they reach a geometrical arrangement where the attraction and repulsion forces are best satisfied. A gel-strength measurement is an indication of the magnitude of these forces under conditions of rest. Yield value is a measurement under flowing conditions of those forces in the mud which cause gel strength under rest conditions.

Various procedures and apparatus, including the Stormer viscosimeter and the Fann V–G Meter, have been used in determining plastic viscosity, yield value, and gel strengths of drilling muds. In a paper entitled "Measurement of Plastic Flow Properties" by Fred Chisholm and Sam Kohen, PETROLEUM ENGINEER, vol. 26, No. 4, pp. B–87—B–90, April, 1954, there is described a procedure employing a Model 30 Fann V–G Meter to measure the plastic viscosity, yield value, and gel strength of a drilling mud.

In the completion of wells, casing is normally lowered into the well and a cement slurry is flowed down the well and up the annular space formed between he casing and the wall of the well. Cement slurries have been emplaced in the annular space between the casing and the wall of the well by flowing them thereinto in direct contact with the mud, thereby displacing the mud from the annular space. This procedure may result in poor cement jobs because of contamination of the cement slurry and because of failure to remove the filter cake from the wall of the well. In order to obtain improved cement jobs, various techniques, including the use of preflush solutions or washes, have been developed. For example, Joseph G. Savins, in U.S. Pat. No. 3,291,211, describes a method of cementing a well wherein the drilling mud in the annular space between casing and a wellbore wall is removed by passing into a well, prior to placing a cement slurry therein, a liquid comprising a solvent containing dissolved therein a solute which imparts viscoelastic properties to the liquid. Joseph U. Messenger, in U.S. Pat. No. 3,348,612, describes a technique of cementing casing in a well wherein a slug of liquid having mutual solubility for oil and water is passed into a well and into the annular space formed between the wall of the well and the outer surface of the casing and is followed by a cement slurry. A slug of an organic solvent for oil and asphalt may be passed into the annular space ahead of the slug of liquid having mutual solubility for oil and water.

Another technique for cementing casing in a well is described by Joseph U. Messenger in U.S. Pat. No. 3,467,193. A preflush comprised of formation water containing dispersants is flowed through the annular space formed between casing and the wall of a well. Thereafter, a spearhead of cement slurry containing a turbulence inducer and silica or diatomaceous earth particles and having a density at least as great as the drilling mud employed in drilling the well is flowed into the annular space. This is followed by a densified cement slurry and the cement slurries allowed to set.

SUMMARY OF THE INVENTION

This invention is directed to a method of cementing casing in a well penetrating a subterranean formation, which well has therein an oil base drilling mud. A slug of a preflush solution comprised of an oil and a dispersant, which solution has a lower viscosity and lower gel strength than the drilling mud and has a critical turbulence pump rate of no greater than three barrels per minute, is flowed into the annular space between the casing and the wall of the well. Thereafter, cement slurry is emplaced in the annular space and allowed to set and form an impermeable cement sheath which bonds the casing to the wall of the well. In another embodiment, the preflush solution further includes a viscosifier, and a weighting material.

DESCRIPTION OF THE PREFERRED EMBODIMENTS

This invention is directed to a method of cementing casing in a well that has an oil base drilling mud therein and has a filter cake on the wall of the well.

In accordance with this invention a preflush solution comprised of an oil and a dispersing agent is injected into a well that has an oil base drilling mud therein and into the annular space between the casing and the wall of the well to displace the mud and remove the filter cake from at least a portion of the annular space. This is followed by a cement slurry which is emplaced in the annular space and allowed to set, thereby forming an impermeable cement sheath which bonds the casing to the wall of the well. In another embodiment, water having a water wetting surfactant therein is flowed into the annular space following the preflush solution and preceding the cement slurry to displace the oil from the surface of the casing and the wall of the well.

The preflush solution is designed for use in a well having an oil base drilling mud therein and is formulated to have a lower viscosity and lower gel strength than the drilling mud. Further, the preflush solution is formulated to have a critical turbulence pump rate of no greater than three barrels per minute. By the term "critical turbulence pump rate" is meant the pump rate at which the preflush solution will go into turbulence when flowed through a ½-inch annulus formed between two concentric pipes, the smaller of which has an outside diameter of 7 inches, and the larger of which has an inside diameter of 8 inches. A low critical turbulence pump rate is beneficial for two reasons: (1) the well wall is exposed to turbulent action a maximum length of time for a given volume of preflush solution; and (2) a lower pump pressure can be used to obtain turbulent flow than must be used for solutions having higher critical turbulence pump rates. The dispersing agent employed in carrying out the present invention may be any suitable material which functions to promote and maintain separation of the individual, extremely fine particles of solids which are usually of colloidal size. As will be recognized by those skilled in he art, various such dispersing agents are conventionally employed in drilling muds in order to maintain adequate dispersion of clays added to impart desired rheological properties to such muds. A particular dispersing agent which gives good results when employed in the preflush and which is preferred in practicing the present invention is lecithin. Lecithin is a naturally occurring amino, and is available from Baroid Division, National Lead Company, under the trade name "Driltreat."

A particular preflush solution found to give good results is comprised of an oil and lecithin in an amount of 1 to 5 pounds per barrel of preflush solution. Oils that are preferred are kerosene, diesel oil, and mixtures thereof because they are compatible with oils used in oil base drilling muds. However, other oils such as light crude oils may be used.

This preflush solution goes into turbulence at a low rate of flow, thus exposing the wall of the well to the scouring action of turbulent flow for a maximum amount of time for a given size slug of solution. In addition, the dispersing agent permeates the filter cake and through dispersing action causes a deterioration of the filter cake. Thus, by combination of the turbulent action and dispersing action the filter cake is effectively removed. In addition, the turbulent action of the preflush solution effectively displaces the drilling mud from the portion of the annular space into which cement slurry is to be emplaced. A 10- to 50-barrel slug of preflush solution injected into the well and into the annular space preceding the cement slurry is sufficient to displace the drilling mud and filter cake from the portion of the annular space of concern, thereby allowing a good cement sheath to be formed between the casing and the wall of the well.

An aqueous wash containing a water wetting surfactant may be flowed into the annular space subsequent to the preflush solution and prior to the cement slurry to remove from the casing the oil film remaining from the preflush solution, thereby providing a clean surface and enhancing the bond formed between the cement sheath and the casing. This aqueous wash, when employed, should be flowed into the annular space in an amount of five to 50 barrels, preferably 10 to 20 barrels, and should contain ½ to 10 pounds of water wetting surfactant per barrel of water and preferably 2 to 4 pounds per barrel. A suitable water wetting surfactant may be chosen from the classes of nonionic and anionic surfactants. An example of a class of nonionic surfactants from which a suitable water wetting surfactant may be chosen is the polyoxyethylene-aryl ethers of the structural formula:

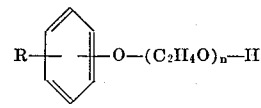

wherein:
R is a hydrogen atom or an aliphatic substituent having no more than nine carbon atoms, and
n is an integer within the range of 10 to 100.

Within the class of nonionic surfactants a preferred surfactant is the poloyoxyethylene ether of phenol having 30 ethylene oxide groups. Anionic surfactants which may be employed in the present invention may be chosen form he class of salts of fatty acids or salts of sulfonic acid derivatives. Two examples of anionic surfactants are di-ethyl sodium succinate and sodium lauryl sulfonate.

When cementing a well having a weighted oil base drilling mud therein, I have found it desirable to displace the oil base drilling mud ahead of the cement slurry with a weighted preflush solution. It is particularly important to use a weighted preflush solution having approximately the same weight as the drilling mud when there exists in communication with the well a formation having fluids under high pressure contained therein. The use of such a preflush solution ensures that the hydrostatic pressure exerted by the drilling mud in the well is not lessened, thereby allowing the fluids under high pressure in the formation to flow uncontrollably into the well.

A weighted preflush solution which I have found to be particularly suitable for such an application is comprised of an oil, a viscosifier, a weighting material, and a dispersing agent formulated to have a lower viscosity and a lower gel strength than the drilling mud and to have a critical turbulence pump rate of no greater than three barrels per minute. Oils found to be particularly useful in this preflush solution are kerosene, diesel oil and mixtures thereof, though other oils may be used. A viscosifier found to be particularly useful is an amine substituted bentonite used in a sufficient amount to increase the viscosity of the preflush solution to a value which will prevent settling of the weighting material.

Normally no more than 5 pounds of viscosifier per barrel of preflush solution are required to provide this viscosity. Such a viscosifier can be prepared by treating bentonite, sodium form, with a long-chain quaternary ammonium salt and is available under the trade name of "Geltone." A weighting material suitable for use in this preflush solution is barite. A sufficient amount of barite should be used to increase the weight of the preflush solution to a weight of at least 14 pounds per gallon and preferably to approximately the weight of the drilling mud in the well. A particular dispersing agent found to be useful in this preflush solution is lecithin which is available under the trade name of "Driltreat." A sufficient amount of the dispersing agent is added to ensure that the weighted preflush solution has a critical turbulence pump rate of no greater than three barrels per minute. Normally this requires no more than 5 pounds of dispersing agent per barrel of preflush solution. The dispersing agent reduces the interparticle forces in the preflush solution and thereby the yield value of the preflush solution, thus enabling the solution to go into turbulence at a low rate of flow.

What is claimed is:

1. A method of cementing casing in a well penetrating a subterranean formation, said well having an oil base drilling mud therein, comprising:
   a. flowing a slug of preflush solution comprised of an oil and a dispersing agent, said solution having a lower viscosity and lower gel strength than said drilling mud and having a critical turbulence pump rate of no greater than three barrels per minute, into the annular space between said casing and the wall of said well;
   b. flowing into said annular space and emplacing therein a cement slurry; and
   c. allowing said cement slurry to set and form an impermeable cement sheath which bonds said casing to said wall of said well.

2. The method of claim 1 wherein said oil is selected from the group consisting of kerosene, diesel oil, and mixtures thereof.

3. The method of claim 1 wherein the volume of said slug of preflush solution is within the range of 10 to 50 barrels.

4. The method of claim 1 wherein said dispersing agent is lecithin.

5. The method of claim 4 wherein the amount of lecithin in said preflush solution is 1 to 5 pounds per barrel of said preflush solution.

6. The method of claim 1 further comprising, subsequent to step (a) and prior to step (b), flowing a slug of an aqueous solution having a water wetting surfactant therein into said annular space between said casing the the wall of said well.

7. The method of claim 6 wherein said slug of an aqueous solution is injected in an amount within the range of 5 to 50 barrels and contains therein ½ to 10 pounds per barrel of a polyoxyethylene-aryl ether of the structural formula:

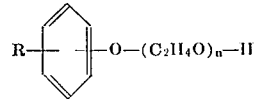

wherein:
R is a hydrogen atom or an aliphatic substituent having no more than nine carbon atoms, and
$n$ is an integer within the range of 10 to 100.

8. A method of cementing casing in a well penetrating a subterranean formation, said well having an oil base drilling mud therein, comprising:
   a. flowing a slug of preflush solution comprised of an oil, a dispersing agent, a viscosifier, and a weighting material, said solution having a lower viscosity and lower gel strength than said drilling mud and having a critical turbulence pump rate of no greater than three barrels per minute, into the annular space between said casing and the wall of said well;
   b. flowing through said annular space and emplacing therein a cement slurry; and
   c. allowing said cement slurry to set and form an impermeable cement sheath which bonds said casing to said wall of said well.

9. The method of claim 8 wherein the volume of said slug of preflush solution is within the range of five to 50 barrels.

10. The method of claim 9 wherein said oil is selected from the group consisting of diesel oil, kerosene, and mixtures thereof.

11. The method of claim 10 wherein said dispersing agent is lecithin.

12. The method of claim 11 wherein said viscosifier is an amine substituted bentonite.

* * * * *